United States Patent [19]
Ohzeki

[11] Patent Number: 5,653,783
[45] Date of Patent: Aug. 5, 1997

[54] METHOD OF PRODUCING FINE METAL BALLS

[75] Inventor: Yoshio Ohzeki, Kawasaki, Japan

[73] Assignee: Nippon Steel Corporation, Tokyo, Japan

[21] Appl. No.: 552,549

[22] Filed: Nov. 3, 1995

Related U.S. Application Data

[63] Continuation-in-part of Ser. No. 375,365, Jan. 19, 1995, abandoned.

[30] Foreign Application Priority Data

Jan. 20, 1994 [JP] Japan .................................. 6-022195
Jan. 17, 1995 [JP] Japan .................................. 7-023390

[51] Int. Cl.⁶ .................................................. B22F 1/00
[52] U.S. Cl. .......................... 75/340; 75/342; 75/370
[58] Field of Search .......................... 75/340, 341, 342, 75/370

[56] References Cited

U.S. PATENT DOCUMENTS

| | | | |
|---|---|---|---|
| 2,952,868 | 9/1960 | Rowan | 75/342 |
| 3,063,099 | 11/1962 | Turner et al. | 75/342 |
| 4,842,654 | 6/1989 | Shindo et al. | 75/342 |

FOREIGN PATENT DOCUMENTS

| | | | |
|---|---|---|---|
| 50-102558 | 8/1975 | Japan. | |
| 904211 | 8/1962 | United Kingdom | 75/342 |
| 2265156 | 9/1993 | United Kingdom | 75/342 |

*Primary Examiner*—George Wyszomierski
*Attorney, Agent, or Firm*—Pollock, Vande Sande & Priddy

[57] ABSTRACT

A method for efficiently and accurately manufacturing fine metal balls such as solder is provided. A liquid is poured into a vertically elongated cylindrical container, where the liquid is heated up to a temperature higher than the melting point of the metal from its top to middle regions and maintained at a temperature lower than the melting point in the lower region. Metal pieces each of which is made to have a predetermined volume are dropped into the container. The metal pieces are heated and melted while passing the high-temperature region, and take the shape of a substantial sphere due to their own surface tension. However, when the balls reach the low-temperature region, they are cooled and solidified to become substantially perfect metal balls. Since this process can be successively performed, a large number of fine low-melting-point metal balls with high dimensional accuracy can be efficiently manufactured by combining the process with a wire cutter with a high accuracy.

9 Claims, 1 Drawing Sheet

METHOD OF PRODUCING FINE METAL BALLS

This application is a continuation in part of U.S. Ser. No. 08/375,365, filed Jan. 19, 1995, now abandoned.

BACKGROUND OF THE INVENTION

The present invention relates to a method of producing fine metal balls such as very small solder balls used to electrically connect integrated circuits (ICS).

Conventional methods of manufacturing fine metal balls having a low melting point include 1) an atomization method and 2) a method involving dipping metal pieces into a heated liquid. In the Japanese Unexamined Patent Publication No. 50-102558 there is proposed a method for manufacturing fine metal balls which comprises the steps of printing paste, which contains low-melting-point metal powder, onto a metal plate through a porous plate to thereby partition the paste into a predetermined amount, and then heating them.

Although the atomization method is suitable for producing a large number of particles, it is not suitable for shaping particles into balls or for making particles with the same intended size. On the other hand, the method involving dipping metal pieces into a heated liquid can produce particles with substantially spherical shapes and increase the accuracy in the size of balls by using metal pieces of the same size prepared beforehand. However, this method is unsuitable for mass production due to poor work efficiency and poor productivity factors as it is necessary to maintain a large space between metal particles so that molten metal particles do not stick or do not join together when contacting each other in a liquid and as a period of time is required to cool the liquid down to a temperature less than the melting point of the metal so that the molten metal particles can be solidified while retaining the shape of a ball.

Although the method disclosed in the Japanese Unexamined Patent Publication No. 50-102558 is suitable for mass production, it is difficult to provide balls having a precise size due to the distortion of the balls into a flattened shape in a case where the diameter of the balls is large. It is also difficult to accurately partition metal having a low melting point due to the use of a printing process, and to obtain the constant dimension accuracy of fine balls due to uneven blending of metal particles. Because of these problems, the diameter of balls is disadvantageously limited to 0.1 to 1.0 mm.

The prior art does not satisfy all of the following requirements: controllability for providing metal balls with a uniform diameter; providing a perfect ball shape; mass-producibility; and permitting a wide range of ball sizes.

SUMMARY OF THE INVENTION

The object of this invention is to provide a process for manufacturing fine metal balls which enables the efficient mass production of the metal balls having a precise size, a wide range of producible sizes and a substantially perfect ball shape, by using a remarkably improved means for dropping metal pieces into a heated liquid, so that the drawbacks of the prior art are removed.

According to the first aspect of the invention, there is provided a method of manufacturing fine metal balls, comprising the steps of preparing metal pieces of a predetermined volume (or weight), dropping the metal pieces into a liquid maintained at a temperature higher than the melting point of the metal so that each of the metal pieces is heated and melted to obtain the shape of a ball (i.e. sphere) because of its own surface tension, keeping a lower region of the liquid at a temperature lower than the melting point of the metal so that the solidified metal balls are formed when the molten metal balls formed in the upper high-temperature region of the liquid descend due to gravity though the low-temperature region.

It is preferable to use a liquid having the effect of removing the oxide layer formed on the surface of the metal.

It is also preferable to locate at the upper portion of the initial liquid a second liquid having the effect of removing the oxide film layer formed on the surface of the metal so that metal pieces are heated and melted after the metal pieces have passed the oxide layer-removing liquid.

The liquid used in the present invention is, for example, 1) such a liquid that, although it has the function of flux, its reactivity is not intensive or 2) a liquid with conventional flux which is diluted with fluoric oil or silicone oil etc. to thereby reduce the reactivity of the liquid to a predetermined proper degree.

When dropping the metal pieces into the heated liquid, it is preferable to drop the metal pieces together with another liquid having affinity for and readily mixed with the heated liquid.

In the present invention, metal balls are obtained by dropping metal pieces into a liquid maintained at a temperature higher than the melting point of the metal, and the metal pieces are heated and melted so that they can have the shape of a sphere due to their own surface tension. The liquid is received in a vertically elongated cylindrical container, in which it is heated to a temperature higher than the melting point of the metal pieces in a range from top to the middle of the container and maintained at a temperature lower than the melting point of the metal pieces in the lower region below the middle of the container.

When metal pieces are being dropped into the container, they are heated and melted while passing through the high-temperature region, and the substantially spherical shape is brought about because of their own surface tension. The balls then pass to the low-temperature region where they are cooled and solidified to become substantially perfect metal balls. Balls of a predetermined constant size (or weight) can be obtained by using metal pieces of the same size, for example, prepared by cutting wires of a constant diameter (or cross-section) or ribbons of a constant width and thickness into pieces of a constant length.

Since in the method of cutting the wires it is possible to use solder wire etc. commercially sold, the method is suited to produce the metal balls at a mass production scale and at a low cost. In addition, the production of wire of a constant diameter is readily performed in comparison with that of ribbon with both a constant width and a constant thickness.

Various methods can be used for dropping metal pieces into the liquid. For example, one is a method in which a parts feeder is used to separate the cut metal pieces in such a way that they fall into the liquid without sticking to each other, and another is a method in which a wire cutter is used for successively cutting wires into pieces of a constant length in such a manner that they fall into the liquid.

In this invention, metal pieces are melted, while descending through a liquid, to become liquid droplets in the shape of balls, and then solidified. In this case, many metal balls can be manufactured in a short period of time because metal pieces descend at the substantially the same speed, and the disadvantages such as the contact or integrating of metal pieces or droplets can be avoided even when the pieces are dropped successively into a liquid.

The liquid used in the method of the present invention must have a boiling point sufficiently higher than the melting point of the metal, and must have no harmful chemical and physical effect on the metal. A liquid having a lower vapor pressure at high temperatures is more easily treated. The larger the specific gravity and viscosity of a liquid is, the smaller becomes the speed at which both the metal pieces and molten droplets pass the liquid, so that it becomes possible to keep a sufficient period of time necessary for the metal piece to melt and to become spherical in shape. Silicone oil or fluoric oil can be used as a liquid that meets these requirements.

It is not difficult to keep a liquid portion from the top to the middle of the liquid, which is received in a vertically elongated cylindrical container, at a high temperature while keeping a lower liquid portion at a low temperature. In a case where silicone oil was received in a cylindrical container of heat-resistant glass having an inner diameter of 50 mm and a length of 500 mm, around the middle of which container an electrothermal ribbon was wrapped, and where the silicone oil was then heated so that the upper half of the liquid was maintained at 200° C. or higher, the temperature of the liquid did not exceed 50° C. near its bottom even after the lapse of five hours from the beginning of heating, and there was no need to cool the lower half of the silicone oil.

The type of metal used to obtain fine balls is limited by the nature of the liquid. In particular, a metal with a melting point higher than the boiling point of the liquid cannot be treated, and the manufacture of fine balls is limited to a metal with a low melting point, including alloys such as solder. The temperature of a heated liquid must be at least 10° C. higher than the melting point or liquefaction temperature of the metal, and is preferably maintained at least 50° C. higher than the melting point of the metal. The necessary period of time required for metal pieces and droplets to pass the liquid maintained at this high temperature is to be no less than 0.5 seconds, and preferably no less than 2 seconds to stably obtain a shape close to a sphere.

The surface of a metal such as solder is usually covered with a thin oxide film layer, which prevents the metal from becoming shaped as a ball even when it is heated to the melting point or higher. In a case where a 0.05×2.0 mm solder ribbon comprising 50% of Sn and 50% of Pb was cut into pieces of 5 mm in length, which were then dropped into fluoric oil heated to 300° C. without any previous treatment, 80% or more of the pieces did not become shaped as a ball. Although this problem can be solved by previously pickling the metal pieces or by previously applying a flux to them, this may increase the number of process steps. In addition, solder wires containing a flux in their core are commercially available and applicable to the process. However, wires with such a small diameter are difficult to obtain, and it is also difficult to accurately produce fine balls while using such wires.

Substantially truly spherical droplets can be formed by using, a liquid for melting metal pieces, having the effect of heating and melting metal pieces while simultaneously removing the oxide film (a liquid flux).

In a case where a liquid having the effect of removing the oxide film layer (a liquid flux) of metal pieces is located above a heated liquid, dropped metal pieces are first covered with the flux when passing the liquid and then heated to the melting point or higher while passing the heated liquid. As a result, the oxide film on the metal surface is removed by the effect of the flux to thereby make metal droplets with substantially spherical shape. In order that the liquid can be maintained at a temperature higher than the boiling point of the flux, it is necessary to locate between the heated liquid and the flux another liquid having a specific gravity smaller than the heated liquid and greater than the flux as well as a high boiling point so that this liquid forms an intermediate layer, and to cool the wall of the container near the intermediate layer to prevent the temperature of the flux from reaching its boiling point.

DESCRIPTION OF THE PREFERRED EMBODIMENTS

In the prior art flux for application with low melting point metals (such as solder etc.) such as paste containing pine resin as a main constituent thereof or a liquid containing effective components thereof dissolved in a solvent have been used. Recently, effective components having the same property as that of the conventionally used flux have been synthetically produced, and pharmaceutical liquids containing these effective components are commercially sold. The inventors have discovered that, in a case where there is directly used the conventional flux liquid heated up to a temperature not lower than the melting point of the metal piece, the flux liquid becomes so intensive in reactivity that it becomes impossible to obtain metal balls of a desired dimension due to the adhering (sticking) of metal balls to each other, and that in order to prevent these shortcoming it is necessary to use a heated flux liquid having proper reactivity. When the metal pieces are dropped into the heated liquid, the metal pieces may be dropped into the heated liquid together with another liquid having affinity for and readily mixed with the heated liquid, so that the metal pieces can be dispersed in the heated liquid without adhering or sticking to each other.

The reactivity of the heated liquid varies in accordance with the degree of dilution of the flux liquid. In a case where the degree of dilution is too high or too slight, it is impossible to achieve the intention of the dilution, and a proper degree of the dilution can be found from the actual production results obtained by performing the preliminary treatment In addition to a method of diluting the commercially sold flux liquid, there may be used another method in which the paste or the effective components thereof are mixed with a fluoric oil etc. In a commercially sold flux liquid there are often contained low boiling point-solvents such as alcohol etc., and in a case of using this flux liquid it is necessary to remove such low boiling point-solvents by the previous heating thereof before using the flux liquid. Peanut oil, which has been known to have flux reactivity, begins to have effective reactivity when heated up to a high temperature, and the degree of the reactivity is in a proper range for achieving the flux function, so that it is unnecessary to dilute the peanut oil when it is used, and the peanut oil can be used alone.

The liquid dropped into the heated flux liquid together with the metal pieces may be the same liquid as the heated liquid, may be of another kind similar to the heated liquid, or may be the same oil as the oil used for diluting the flux liquid, that is, any kind of liquid can be used if the liquid is superior in ability of mixing with the heated liquid and if no shortcoming is caused.

Embodiment 1

Figure 1:
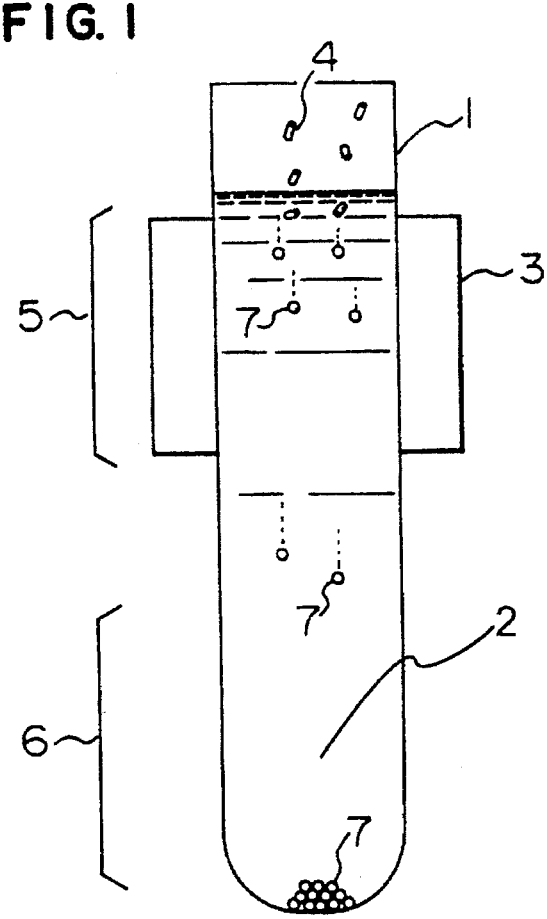
FIG. 1 is a schematic drawing showing one embodiment of the invention.

As shown in FIG. 1, there was prepared a cylindrical container (1) made of heat-resistant glass which container had a diameter of 50 mm and a length of 500 mm. The container was filled with silicone oil (2). The upper portion of the silicone oil located in the upper part of the container was heated by an electric resistance heater (3) provided around the upper part of the container so that the upper part (high temperature portion) of the silicone oil was heated up to 220° C. In the state where the temperature of the high temperature portion of the silicone oil was held at 220° C., the temperature of a lower part of the silicone oil received in the lower part of the container (1) was about 25° C. On the other hand, there was prepared a metal wire having a composition of 63 wt % Sn-37 wt % Pb and a diameter of 0.1 mm, the outer periphery of which wire was coated with flux. The metal wire was cut into metal pieces (4) each having a length of 1.0 mm, and at the same time the cut metal pieces (4) were caused to fall into the silicone oil. Each of the metal pieces passed the high temperature portion of the silicone oil in about 2 seconds, during which period of time the metal piece transformed to a molten state and became a metal ball (7) because of its surface tension. Each of the metal balls (7) further fell through the lower temperature portion (6) of the silicone oil to thereby solidify, and the solidified metal balls were stored on the bottom of the container (1). The production conditions in the Embodiment 1 and the evaluation of the produced metal ball are shown on the lateral column of sample No. 1 in Table 1. Regarding the evaluation of the metal ball shown in Table 1, the mark "⊚" indicates that the number of the metal balls with a good degree of a true sphere was not less than 99% with respect to the whole of the metal balls. The metal ball with good true sphere degree is defined when the difference between the long diameter of the metal ball and the short diameter of the metal ball is no more than 10% of the average diameter of the metal balls.

Figure 2:
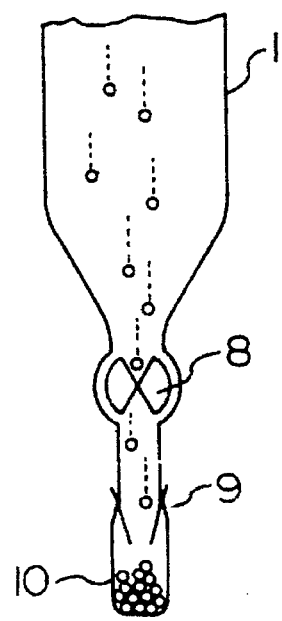
FIG. 2 is a schematic drawing showing means for successively taking out the metal balls.

In the production of other metal balls, in place of the container (1), a container (1') was used which had such a bottom as shown in FIG. 2, at which bottom there was formed a small diameter portion which was provided with an openable or closable glass cock (8) and which was provided at the terminal end thereof with a sliding contact joint portion (9) having an opening. A small vessel for storing and taking out the metal balls was detachably mounted onto the joint portion (9). At the initial stage of the production of the metal balls, the glass cock (8) was opened so that the metal balls fell through the glass cock to be stored in the small vessel (10). When the vessel was filled with a predetermined number of the metal balls, the glass cock was closed, the vessel being detached from the sliding contact joint portion (9) to thereby take out the metal balls, another small vessel being then mounted on the joint portion, and the glass cock was opened for the successively produced metal balls to be stored in another small vessel. By this process, it was possible to successively perform the production of the metal balls.

Regarding the produced metal balls Nos. 2, 4 to 9 and 11 to 15, there are shown in Table 1 the production conditions including the type of metal, the type of liquid, the temperatures of the high temperature and low temperature portions of the liquid, etc. and the evaluation of the metal balls. In the evaluation, the mark "○" indicates that the number of the metal balls which had good true sphere degree of no less than 90% with respect to the whole of the metal balls, the mark "Δ" indicating that the number of the metal balls which had good true sphere degree of no less than 80% with respect to the whole of the metal balls, and the mark "x" indicates that the number of the metal balls which had good true sphere degree of no less than 80% with respect to the whole of the metal balls.

Embodiment 2

While using the same container (1') as in the Embodiment 1, metal balls Nos. 3 and 10 in Table 1 were produced by use of a flux layer and two liquid layers explained below. That is, at the upper part of the container the heated liquid flux layer was located which acted to remove oxide film adhering on the metal pieces, a silicone oil layer (located as an intermediate layer) having a boiling point higher than that of the flux layer (both of which flux layer and the silicone oil layer were made to constitute a high temperature portion of the liquid in which the metal pieces are melted to become metal balls), and a fluoric oil layer which acted as a low temperature portion was located under the silicone oil layer, in which low temperature portion the melted metal balls were solidified. The specific production conditions thereof and the evaluation thereof are shown in Table 1.

Embodiment 3

In this embodiment there was used still another liquid received in the same container (1') as in the Embodiment 1, which liquid had a fluoric oil and a commercial available flux mixed in the fluoric oil at a rate of 10 g of the flux per 1000 ml of the fluoric oil. Cut metal pieces of Ag—Sn eutectic alloy each having a diameter of 35 um and a length of 0.1 mm were projected into a high temperature liquid portion held at a temperature of 260° C. to 80° C., so that metal balls each having a diameter of about 50 um were produced. The projecting cut metal pieces to be put into the liquid, had been previously made to be a mixture of about 5000 metal pieces mixed with and dispersed in fluoric oil of 5 ml, the mixture being divided into 10 portions substantially equal in amount to each other, and the projection of each divided portion into the liquid was performed 10 times with a predetermined interval. The resultant metal balls had an evaluation of "⊚" regarding the true sphere degree.

Embodiment 4

In this embodiment there was used a liquid of peanut oil received in the same container (1') as in the Embodiment 1, which peanut oil liquid was heated up to a temperature of 280° C. to 320° C. at a high temperature portion. Cut metal pieces of eutectic solder, each having a diameter of 50 μm and a length of 0.2 mm were mixed with and dispersed in peanut oil in such a state that about 5000 pieces thereof were mixed with and dispersed in the peanut oil of 5 ml. The mixture was divided into 10 portions substantially equal in amount to each other, and each portion was projected into the high temperature portion in such a manner that the projection of each divided portions into the liquid was performed 10 times with a predetermined interval. The resultant metal balls had an evaluation of "⊚" regarding the true sphere degree.

Embodiment 5

In this embodiment there were used the same container as that of Embodiment 1 and such heated flux liquids diluted by fluoric oil as disclosed in Sample Nos. 1 to 6 in Table 2. According to the production result of metal balls having various composition and various diameters, there were obtained good evaluation results in a case where the flux liquid was diluted to have a flux component of 2 to 25% by weight. On the other hand, in another case where flux amount is too high, as 50% or 100% in Comparative Sample Nos. 12, 14 and 15 or too slight, as 1.4% in Comparative Sample No. 10, evaluation results were inferior regarding the shape of metal balls or regarding the diameter of the metal balls as disclosed in Table 2. Namely, in the case where the heated flux liquid contains too much flux component, there occurred the adhering (fixing) of metal balls, (i.e. inferior evaluation regarding metal ball diameter) which is deemed to be caused by excessive surface purification of metal balls due to intensive flux effect. In the case where the flux liquid contains too slight amount of flux component, there occurred the inferior shape of the metal balls which is deemed to be caused by insufficient flux effect.

Embodiment 6

In this embodiment there were used the same container as that of Embodiment 1 and peanut oil having suitable reactivity of flux when used as a heated liquid in the container. As a result, there were obtained good evaluation results as shown in Sample Nos. 7, 7-1, 7-2, 7-3, 8 and 9 in Table 2.

Embodiment 7

In this embodiment, by using the same container as that of Embodiment 1, the effects of dropping the metal pieces into the heated flux liquid together with the same liquid in which the metal pieces had been dipped as the heated flux liquid were studied. As apparent by comparing Sample No. 3 with Comparative Sample No. 11, in the case of Comparative Sample No. 11, where only metal pieces were dropped into the heated liquid, there occurred large variation of metal ball diameters (,i.e., inferior evaluation regarding metal ball diameter )due to inferior dispersion of the metal pieces in the heated liquid although there was used the same liquid as in Sample No. 3. The same matter is apparent from the comparison between Sample No. 7 and Comparative Sample No. 13 both of which were produced while using the peanut oil. However, the simultaneous dropping of both the metal pieces and the metal pieces-dipping liquid was not so effective when the metal balls had a relatively large size, because large metal pieces corresponding to the large metal balls were readily treated and were able to be readily dispersed by use of a part-feeder etc. On the other hand, regarding metal balls having small diameters not more than 100 μm, the simultaneous dropping of both the metal pieces and the metal pieces-dipping liquid can bring about remarkable effect as shown in Example Nos. 1 to 6, 8 and 9 in Table 2."

According to this invention, since metal pieces are melted into droplets with the shape of a ball because of their own surface tension, and all of the cooling and solidifying processes are finished while the droplets are descending through the liquid, the shape of the balls is not distorted and metal balls with a shape of an substantial sphere can be obtained. This invention allows a large number of low-melting-point metal balls with a high dimensional accuracy and sphericity to be efficiently manufactured. Advantageously, this invention also prevents the surface of metal balls from being oxidized because they are processed in a liquid isolated from the air, thereby providing metal balls with a good surface characteristic.

TABLE 1

| No. | Type of metal · Melting point (°C.) | | Heated liquid | | | | Pieces | | Previous Treatment |
|---|---|---|---|---|---|---|---|---|---|
| | | Composition | $T_1$ | $T_2$ | t | Shape | Size | | |
| 1 | 63SnPb Solder | 183 | S | 220 | 25 | 2 | Wire | 0.1 mm Dia. × 1.0 mm | f |
| 2 | 63SnPb Solder | 183 | S | 200 | 20 | 3 | Wire | 0.2 mm Dia. × 2.0 mm | f |
| 3 | 63SnPb Solder | 183 | FL[S]F | 300 | 40 | 2 | Wire | 0.5 mm Dia. × 5.0 mm | n |
| 4 | 50SnPb Solder | 183–215 | F | 330 | 50 | 1 | Ribbon | 0.05 × 2.0 × 5.0 mm | f |
| 5 | 50SnPb Solder | 183–215 | F | 330 | 50 | 2 | Wire | 1.0 mm Dia. × 5 mm (Core) | n |
| 6 | 10Sn Solder | 268–301 | F | 280 | 50 | 3 | Wire | 0.03 mm Dia. × 0.5 mm | f |
| 7 | Wood alloy | 70 | FL | 150 | 20 | 2 | Wire | 0.2 mm Dia. × 2.0 mm | n |
| 8 | In | 156.6 | FL | 200 | 20 | 2 | Ribbon | 0.05 × 1 × 1 mm | n |
| 9 | In | 156.6 | S | 200 | 30 | 3 | Wire | 0.5 mm Dia. × 5.0 mm | a |
| 10 | Sn | 232 | FL[S]F | 270 | 40 | 2 | Wire | 0.2 mm Dia. × 2.0 mm | n |
| 11 | Sn | 232 | F | 280 | 50 | 3 | Ribbon | 0.05 × 1 × 1 mm | f |
| 12 | Pb | 327 | F | 360 | 60 | 1 | Ribbon | 0.05 × 2.0 × 5.0 mm | a |
| 13 | 50SnPb Solder | 183–215 | F | 300 | 50 | 3 | Ribbon | 0.05 × 2.0 × 5.0 mm | n |
| 14 | 10Sn Solder | 268–301 | F | 320 | 50 | 0.3 | Wire | 0.03 mm Dia. × 0.5 mm | f |
| 15 | Sn | 232 | F | 270 | 40 | 2 | Wire | 0.2 mm Dia. × 2.0 mm | n |

| No. | Dropping means Equipment × quantity | | Diameter mm | Production efficiency pieces/Hr | Shape evaluation |
|---|---|---|---|---|---|
| 1 | Wire cutter | 1 | 0.25 | 10,000 | ⊙ |
| 2 | Wire cutter | 2 | 0.5 | 20,000 | Δ |
| 3 | Parts feeder | 1 | 1.2 | 5,000 | ⊙ |
| 4 | Wire cutter | 3 | 1.0 | 24,000 | ○ |
| 5 | Wire cutter | 2 | 1.7 | 18,000 | ⊙ |
| 6 | Wire cutter | 3 | 0.09 | 30,000 | Δ |
| 7 | Wire cutter | 2 | 0.5 | 20,000 | ⊙ |
| 8 | Wire cutter | 3 | 0.45 | 28,000 | ○ |

TABLE 1-continued

|   |   | 9 | Parts feeder | 2 | 1.2 | 10,000 | ⊚ |
|---|---|---|---|---|---|---|---|
|   |   | 10 | Wire cutter | 2 | 0.2 | 20,000 | ⊚ |
|   |   | 11 | Wire cutter | 3 | 0.45 | 28,000 | ⊚ |
|   |   | 12 | Wire cutter | 3 | 1.0 | 24,000 | ○ |
|   |   | 13 | Wire cutter | 1 | 1.0 | — | X |
|   |   | 14 | Wire cutter | 1 | 0.09 | — | X |
|   |   | 15 | Wire cutter | 1 | 0.5 | — | X |

S: Silicone oil
F: Fluoric oil
FL: Flux
[S]: Silicone oil in middle layer
$T_1$: Temperature of high-temperature region of liquid (°C.)
$T_2$: Temperature of low-temperature region of liquid (°C.)
t: Time required to pass through high-temperature region (sec)
f: Application of flux
a: Pickling
n: no previous treatment
(Core): Use of wire containing flux (resin-containing solder)

TABLE 2

| No. | Type of Metal Melting Point (°C.) | | Heated Liquid Constitution Ratio | $T_1$ | $T_2$** | Metal Pieces Shape, Dimensions |
|---|---|---|---|---|---|---|
| 1 | 50Sn Solder | 183–215 | FL:1/F:10* | 300 | 30 | Wire 0.05 mm dia. × 0.2 mm |
| 2 | 50Sn Solder | 183–215 | FL:1/F:5 | 310 | 35 | Wire 0.05 mm dia. × 0.2 mm |
| 3 | 50Sn Solder | 183–215 | FL:1/F:20 | 300 | 30 | Wire 0.05 mm dia. × 0.2 mm |
| 4 | 50Sn Solder | 183–215 | FL:3/F:10 | 290 | 25 | Wire 0.05 mm dia. × 0.2 mm |
| 5 | 50Sn Solder | 183–215 | FL:1/F:50 | 310 | 30 | Wire 0.05 mm dia. × 0.2 mm |
| 6 | Pb | 327 | FL:1/F:5 | 350 | 50 | Wire 0.05 mm dia. × 0.2 mm |
| 7 | 63Sn—Pb Solder | 183 | Peanut Oil | 310 | 40 | Wire 0.2 mm dia. × 2.0 mm |
| 7-1 | 63Sn—Pb Solder | 183 | Peanut Oil | 310 | 40 | Wire 0.2 mm dia. × 2.0 mm |
| 7-2 | 63Sn—Pb Solder | 183 | Peanut Oil | 310 | 40 | 0.3 dia. × 4.0 mm |
| 7-3 | 63Sn—Pb Solder | 183 | Peanut Oil | 310 | 40 | 0.1 dia. × 0.5 mm |
| 8 | 63Sn—Pb Solder | 183 | Peanut Oil | 280 | 40 | Wire 0.03 mm dia. × 0.5 mm |
| 9 | Sn—Ag Eutectic solder | 221 | Peanut Oil | 280 | 45 | Wire 0.03 mm dia. × 0.5 mm |
| 10 | Sn—Ag Eutectic | 221 | FL:1/F:70 | 300 | 30 | Wire 0.03 mm dia. × 0.5 mm |
| 11 | 63Sn—Pb Solder | 183 | FL:1/F:20 | 310 | 35 | Wire 0.03 mm dia. × 0.5 mm |
| 12 | 63Sn—Pb Solder | 183 | FL:1/F:1 | 290 | 30 | Wire 0.03 mm dia. × 0.5 mm |
| 13 | 63Sn—Pb Solder | 183 | Peanut Oil | 310 | 45 | Wire 0.03 mm dia. × 0.5 mm |
| 14 | Pb | 327 | only Flux | 280 | 25 | Wire 0.03 mm dia. × 0.5 mm |
| 15 | Sn | 232 | only Flux | 280 | 40 | Wire 0.03 mm dia. × 0.5 mm |

| No. | Dropping Method | Diameter (mm) | Production Efficiency (pieces/Hr) | Evaluation Shape | Ball Diameter |
|---|---|---|---|---|---|
| 1 | Dropping together with fluoric oil | 0.1 | 10,000,000 | 502 ** | 502 *** |
| 2 | Dropping together with fluoric oil | 0.1 | 10,000,000 | 502 | ⊚ |
| 3 | Dropping together with the same liquid as the heated liquid | 0.1 | 10,000,000 | 502 | ⊚ |
| 4 | Dropping together with the same liquid as the heated liquid | 0.1 | 10,000,000 | 502 | ○ |
| 5 | Dropping together with fluoric oil | 0.1 | 10,000,000 | 603 | ○ |
| 6 | Dropping together with fluoric oil | 0.1 | 10,000,000 | 502 | ○ |
| 7 | Dropping together with peanut oil | 0.5 | 10,000,000 | ⊚ | ⊚ |
| 7-1 | Dropping only metal | 0.5 | 10,000,000 | ⊚ | ⊚ |

TABLE 2-continued

| No. | Description | | | | |
|---|---|---|---|---|---|
| 7-2 | Dropping only metal pieces | 0.8 | 10,000,000 | ⊙ | ⊙ |
| 7-3 | Dropping only metal pieces | 0.2 | 10,000,000 | ⊙ | ⊙ |
| 8 | Dropping only metal pieces | 0.09 | 10,000,000 | ○ | ⊙ |
| 9 | Dropping only metal pieces | 0.09 | 10,000,000 | ⊙ | ⊙ |
| 10 | Dropping together with the same liquid as the heated liquid | 0.09 | 10,000,000 | Δ | ⊙ |
| 11 | Dropping only metal pieces | 0.09 | — | ⊙ | X |
| 12 | Dropping together with fluoric oil | 0.09 | — | ⊙ | Δ |
| 13 | Dropping only metal pieces | 0.09 | — | ○ | Δ |
| 14 | Dropping only metal pieces | 0.09 | — | ⊙ | X |
| 15 | Dropping together with flux | 0.09 | — | ⊙ | Δ |

*"FL:1/F:10" means that the heated liquid contains, by weight ratio, flux of 1 part and fluoric oil of 10 parts.
**The evaluation of the shape is performed in the same standard as in Table 1, and the marks "T$_1$" and "T$_2$" are the same as in Table 1.
***The evaluation of the diameter is performed in such a standard as means that the number of pieces of adhering (sticking) metal balls (to thereby have a larger size) is less than 1% of the whole number of the resultant metal balls, means 0.1 to 1%, means 1 to 5%, and means more than 5%

I claim:

1. A method of producing fine metal balls, comprising the steps of:
   preparing metal pieces of a substantially constant volume or weight,
   dropping the metal pieces into peanut oil liquid maintained at a temperature higher than the melting point of the metal pieces so that each of the metal pieces is heated and is melted to become the shape of a ball, said peanut oil containing about 2 to 25% by weight of components which are capable of bringing about a fluxing function for removing oxide film from the metal pieces, and
   solidifying the melted metal balls in a lower region of the peanut oil liquid, said lower region being kept at a temperature lower than the melting point of the metal balls.

2. A method according to claim 1 further comprising
   dipping said metal pieces into a liquid capable of being mixed with the peanut oil liquid prior to the step of dropping the metal pieces into said peanut oil liquid, and
   dropping said liquid for dipping the metal pieces with said metal pieces into the peanut oil liquid.

3. A method according to claim 1, wherein said preparing step comprises cutting metal wire.

4. A method of producing fine metal balls, comprising the steps of:
   preparing metal pieces of a substantially constant volume or weight,
   dropping the metal pieces into a first liquid maintained at a temperature higher than the melting point of the metal pieces so that each of the metal pieces is heated and is melted to become the shape of a ball, said first liquid containing about 2 to 25% by weight of components which are capable of bringing about a fluxing function for removing oxide film existing on the surface of each of the metal pieces,
   and solidifying the melted metal balls in a lower region of the first liquid having the fluxing function, said lower region being kept at a temperature lower than the melting point of the metal balls.

5. A method according to claim 4 further comprising
   dipping said metal pieces in a pre-treatment liquid capable of being mixed with the first liquid prior to the step of dropping the metal pieces into said first liquid, and
   dropping said pre-treatment liquid with said metal pieces into the first liquid.

6. A method according to claim 5 wherein said pre-treatment liquid and said first liquid are of substantially the same composition.

7. A method according to claim 4, wherein said liquid contains 2 to 20% by weight of components which are capable of bringing about a fluxing function for removing oxide film existing on the surface of each of the metal pieces.

8. A method of producing fine metal balls, comprising the steps of:
   cutting a metal wire into metal pieces of a substantially constant volume or weight and dropping the metal pieces into a first liquid maintained at a temperature higher than the melting point of the metal pieces so that each of the metal pieces is heated and is melted to become the shape of a ball, said liquid containing 2 to 25% by weight of components which are capable of bringing about a fluxing function for removing oxide film existing on the surface of each of the metal pieces, and
   solidifying the melted metal balls in a lower region of the liquid, said lower region being kept at a temperature lower than the melting point of the metal balls.

9. A method according to claim 8, further comprising dipping the metal pieces in a liquid having substantially the same composition as that of the first liquid or another liquid capable of being mixed with the first liquid prior to the step of dropping the metal pieces into the first liquid, and said dropping step comprises dropping both the metal pieces and the liquid in which the metal pieces were dipped into the first liquid.

* * * * *